United States Patent [19]
Mansfield et al.

[11] 3,790,345
[45] Feb. 5, 1974

[54] DETECTION OF DECONTAMINATION OF WATER

[75] Inventors: Geoffrey Harry Mansfield; William Lyth, both of Norton, Stockton-on-Tees, England

[73] Assignee: Imperial Chemical Industries Limited, London, England

[22] Filed: July 19, 1971

[21] Appl. No.: 163,834

[30] Foreign Application Priority Data
July 28, 1970  Great Britain.................. 36,504/70

[52] U.S. Cl. ......... 23/230 R, 23/230 L, 73/40.5 R, 165/70
[51] Int. Cl. ......................................... G01m 3/20
[58] Field of Search......... 23/230 R, 230 L; 165/70; 73/40.5, 40.7

[56] References Cited
UNITED STATES PATENTS
3,087,327  4/1963  Kagi...................................... 73/40.7
3,425,264  2/1969  Frei.................................. 165/70 X
3,522,008  7/1970  Defabaugh et al................ 23/230 L Primary Examiner—Robert M. Reese
Attorney, Agent, or Firm—Cushman, Darby & Cushman

[57] ABSTRACT

Contamination of one aqueous stream by a second such stream, e.g., through leakage in a heat exchanger, is detected by providing phenol in the second stream and analysing for the presence of phenol in the first stream.

3 Claims, 1 Drawing Figure

PATENTED FEB 5 1974                              3,790,345
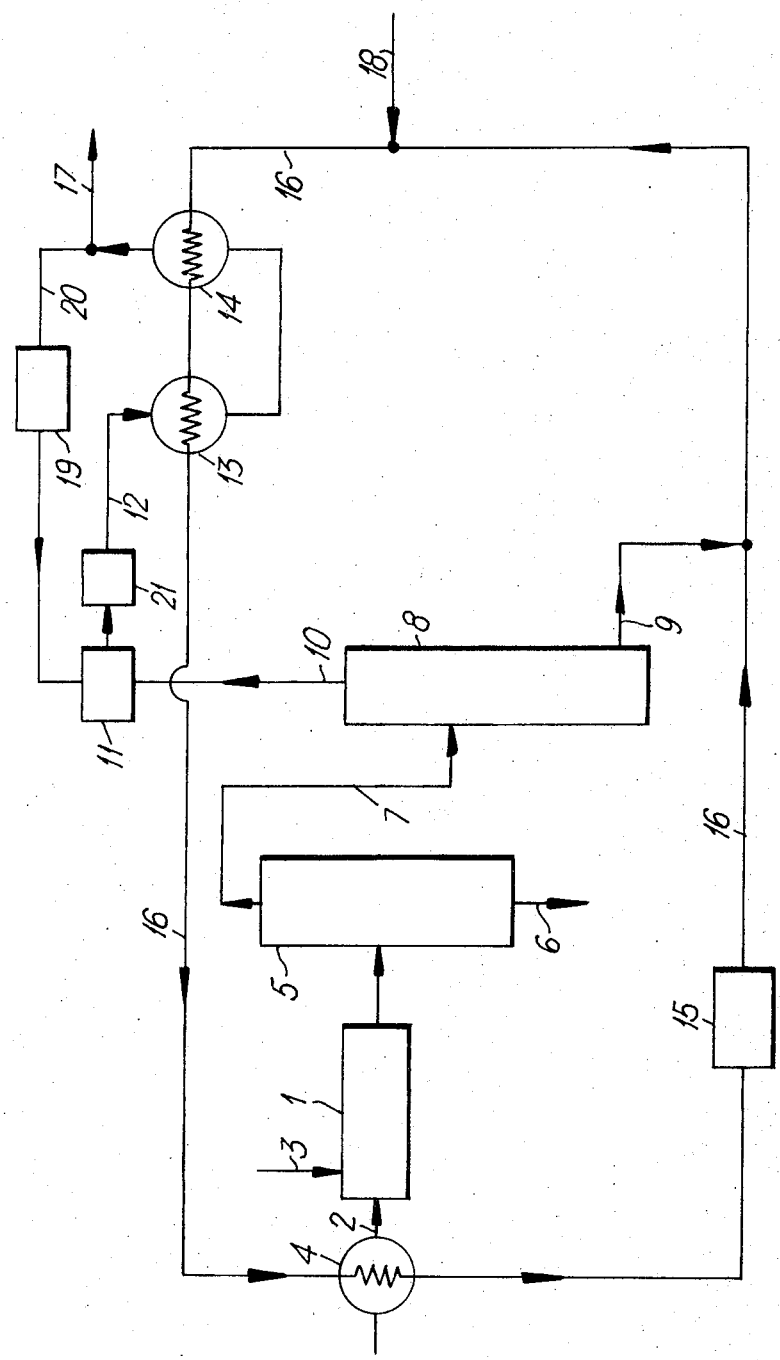
Inventors
Geoffrey Harry Mansfield
William Lyth
By Cushman, Darby, Cushman
Attorneys

DETECTION OF DECONTAMINATION OF WATER

The present invention relates to the detection of contamination of water, especially of water used in chemical processes.

Water is used in chemical processes for a variety of purposes. Depending on the use, the water used may be of varying degrees of purity, but in some circumstances, (for example where the contamination may lead to corrosion) it is important to maintain the level of purity and to prevent contamination by extraneous matter. Where contamination is liable to occur, rapid detection of contamination is very desirable.

We have now found a useful method for detecting contamination of one water stream by another water stream of differing purity from the first.

The present invention is a process for the detection of contamination of a first aqueous stream by a second aqueous stream which comprises providing a phenol in the second aqueous stream and analysing the first aqueous stream for the presence of the phenol.

It is preferred to use phenol itself in the process of the invention. Ortho- or meta-substituted phenols, especially phenols substituted with one or more methyl or ethyl groups, may be used also; for example, ortho-cresol is suitable.

It is convenient to arrange for a phenol to be present continuously in the second aqueous stream, either by being deliberately fed to the aqueous stream or, as happens in some cases, by being present in the aqueous stream as a result of an earlier stage in the chemical process in which the water is being used. However, if desired, the phenol may be added to a second aqueous stream only on those occasions when contamination of the first aqueous stream is suspected to be occurring.

Analysis for the presence of the phenol in the first aqueous stream may be carried out continuously or at intervals as desired. The analysis may be carried out using a conventional manual method but it is preferred to analyse for the phenol continuously and to use a suitable automatic analytical technique, for example a colorimetric method of detection. The preferred method is the colorimetric analysis for phenol itself using, for example, p-aminodimethylaniline, or sulphanilic acid or 4-amino-anti pyrene as the reagent and it is further preferred to use this method in an automatic fashion, for example on a Technicon Auto Analyser (Trademark).

The invention is particularly suitable for chemical processes in which two aqueous streams come into close proximity, for example in heat exchangers. In some processes, it is the usual practice to use a stream of hot water of relatively lower or higher purity to heat a stream of cool water of relatively greater or lesser purity. For example, hot water of high absolute purity (conductivity 3 to 4 micromhos $cm^{-1}$) is required to raise high pressure steam, for example, of 1,800 p.s.i.g., to drive turbine compressors, the high purity water being necessary to minimise corrosion of the steam raising boilers. One method of heating or partially heating this water is to heat exchange it with another stream of hot water of lower purity. Clearly, it is highly desirable to avoid contamination of the high purity stream by the impure stream and, therefore, to be able to detect when such contamination is occurring. We have found the process of this invention to be very suitable for this purpose.

The invention will now be described by way of example with reference to the accompanying DRAWING which is a simplified diagram of part of a naphtha cracking plant.

Naphtha feedstock and steam are fed into a series of crackers 1 by lines 2 and 3 respectively. Before entering the crackers 1 the naphtha is heated by passage through a series of heat exchangers 4. The cracked product comprising principally hydrocarbons, steam and hydrogen is passed to a primary fractionator 5 in which a heavy oil is separated as bottoms product and removed by line 6. The process hydrocarbons and water are removed overhead by line 7 and are passed to a secondary fractionator 8. Here the water is removed through line 9 and the process gases are removed overhead by line 10 to a series of compressors 11.

The compressors 11 are driven by high pressure steam (1,800 p.s.i.g.) generated in boiler 19 and fed to them through line 20. The steam is derived from pure water (conductivity less than 5 micromhos $cm^{-1}$) to minimise corrosion of the turbine condensors 21 to which the steam is passed after use in the compressors. The steam is then recycled as condensate along line 12 and is partially re-heated in heat exchangers 13 and 14 before passage into boiler 19.

Heat exchangers 4, 13 and 14 form part of a hot water belt around the naphtha processing plant. These heat exchangers are linked to each other and to a boiler 15 by line 16. Part of the water in the hot water belt system is supplied by water removed through line 9 from the secondary fractionator 8. This stream of water usually contains impurities, for example hydrocarbons boiling in the range 50° to 205°C, trace element ions such as those of sodium, phenol and other hydrocarbons. A check on contamination of the high purity water obtained from the turbine condensors 21 by leakage through the heat exchangers 13 and 14 is made by removing samples of the high purity stream through line 17 either at intervals or continuously and analysing the samples for phenol. If the hot water belt requires additional phenol to be added to it to bring the phenol concentration to a level at which the check can be made or if there is no phenol in the water entering the hot water belt through line 9, then an aqueous solution of phenol may be admitted to the hot water belt through line 18.

The phenol present in the samples taken through line 17 is analysed on a Technicon Auto Analyser (Trademark) using 4-aminoanti-pyrene as the reagent.

The method of analysis of phenol detects amounts of phenol as low as 0.001 parts per million. This has allowed the detection of contamination by the method of the present invention at a level of one part of the relatively impure water in 30,000 parts of the purer water. This method therefore greatly facilitates the operation of, for example, heat exchangers using two water streams of different purities since contamination of one stream by the other can be detected quickly even at very low levels of contamination.

We claim:

1. A process for detecting water contamination in a naphtha cracking process which comprises feeding steam and naphtha to a cracker to give a cracked product comprising hydrocarbons including a phenol as impurity, steam and hydrogen; fractionating the cracked product to separate condensed steam as impure water containing the phenol impurity from the hydrocarbons; feeding the thus separated hydrocarbons to a series of compressors driven by high pressure steam; generating said high pressure steam from pure water having a conductivity of less than 5 micromhos cm$^{-1}$ in a heating system including a boiler and heat exchange with the impure water containing phenol separated from the hydrocarbons in said fractionation; feeding the steam thus generated from said pure water to said compressors whereby said steam from said pure water is condensed; recycling the condensed steam from said pure water to said heating system for the generation of more steam by heat exchange with the impure water containing the phenol and analyzing the recycled condensed steam from said pure water for the presence of phenol therein so as to determine if there is any contamination of said pure water by the impure water used for the heat exchange.

2. A process as claimed in claim 1 wherein the phenol is selected from the group consisting of phenol and ortho- and meta-substituted phenols.

3. The process of claim 1 wherein phenol is also separately added to the impure water to bring the phenol concentration to the desired level.

* * * * *